(12) United States Patent
Kim et al.

(10) Patent No.: US 11,436,022 B2
(45) Date of Patent: Sep. 6, 2022

(54) SEMICONDUCTOR MEMORY DEVICE FOR HASH SOLUTION AND METHOD OF DRIVING THE SAME

(71) Applicant: Samsung Electronics Co., Ltd., Suwon-si (KR)

(72) Inventors: Cholmin Kim, Suwon-si (KR); Jiyong Lee, Suwon-si (KR); Jongmin Park, Suwon-si (KR); Deokho Seo, Suwon-si (KR); Kwanghee Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/599,358

(22) Filed: Oct. 11, 2019

(65) Prior Publication Data

US 2020/0241886 A1 Jul. 30, 2020

(30) Foreign Application Priority Data

Jan. 29, 2019 (KR) ........................ 10-2019-0011018

(51) Int. Cl.
| | |
|---|---|
| *G06F 13/00* | (2006.01) |
| *G06F 9/4401* | (2018.01) |
| *G06Q 20/06* | (2012.01) |
| *G06F 13/16* | (2006.01) |
| *G06F 21/60* | (2013.01) |

(52) U.S. Cl.
CPC ........ *G06F 9/4411* (2013.01); *G06F 13/1668* (2013.01); *G06F 21/602* (2013.01); *G06Q 20/0658* (2013.01)

(58) Field of Classification Search
CPC .. G06F 9/4411; G06F 13/1668; G06F 21/602; G06Q 20/0658
USPC ................................ 710/104, 100, 200–240
See application file for complete search history.

(56) References Cited

U.S. PATENT DOCUMENTS

| | | | |
|---|---|---|---|
| 7,278,128 B1 * | 10/2007 | Trimberger | ............. G06F 30/34 716/117 |
| 8,327,187 B1 | 12/2012 | Metcalf | |
| 9,069,810 B2 | 6/2015 | Kim et al. | |
| 9,106,217 B2 | 8/2015 | Jaussi et al. | |
| 9,973,347 B2 | 5/2018 | Zhang et al. | |
| 10,162,554 B2 | 12/2018 | Zheng et al. | |
| 2008/0162869 A1 * | 7/2008 | Kim | ..................... G06F 12/0893 711/216 |
| 2009/0113166 A1 * | 4/2009 | Houston | ............. G06F 11/1068 711/216 |
| 2013/0275656 A1 * | 10/2013 | Talagala | .............. G06F 12/0246 711/103 |
| 2014/0137119 A1 | 5/2014 | Hyde et al. | |
| 2017/0090949 A1 | 3/2017 | Arms et al. | |
| 2017/0201503 A1 | 7/2017 | Jayasena et al. | |
| 2017/0220634 A1 * | 8/2017 | Kanaujia | ............. G06F 16/9027 |

(Continued)

*Primary Examiner* — Henry Tsai
*Assistant Examiner* — Kim T Huynh
(74) *Attorney, Agent, or Firm* — Harness, Dickey & Pierce. P.L.C.

(57) ABSTRACT

A semiconductor memory device for a hash solution includes a hashing logic block including a plurality of hashing logics configured to perform a hash function, a memory cell block including a plurality of memory cells, and an input/output (I/O) control structure configured to change a data interface between the hashing logic block and the memory cell block based on a characteristic of the hash function to be performed.

18 Claims, 7 Drawing Sheets

(56) References Cited

U.S. PATENT DOCUMENTS

2017/0271011 A1\* 9/2017 Sasao .................... G06F 3/0673
2017/0286313 A1 10/2017 Jiang et al.
2018/0336035 A1 11/2018 Choi et al.

\* cited by examiner

SEMICONDUCTOR MEMORY DEVICE FOR HASH SOLUTION AND METHOD OF DRIVING THE SAME

CROSS-REFERENCE TO RELATED APPLICATION

This application claims benefit of priority from Korean Patent Application No. 10-2019-0011018, filed on Jan. 29, 2019, the disclosure of which is incorporated herein by reference in its entirety.

BACKGROUND

1. Field

Devices and methods consistent with example embodiments relate to a semiconductor memory device for a hash solution and a method of driving the same.

2. Description of Related Art

With the development of block chain technology, various virtual currencies have been developed and traded. Each block chain (or virtual currency) has its own hash function. A new hash algorithm may be developed to develop a new block chain (or virtual currency). Thus, each block chain (or virtual currency) may have a corresponding unique hash algorithm. Although various kinds of block chain techniques have been developed and used to perform the various unique block chain hash algorithms, a semiconductor memory device for various kinds of block chain hash algorithms has not been developed.

SUMMARY

Some example embodiments of the inventive concepts are directed to providing a semiconductor memory device for a hash solution, which may operate for various hash functions and improve hash efficiency (e.g., the mining efficiency of a cryptocurrency), and/or a method of driving the semiconductor memory device.

In addition, some example embodiments of the inventive concepts are directed to providing a semiconductor memory device for a hash solution, which may dynamically adjust a memory interface according to a memory access method and perform a hash function using a processing-in memory (PIM), and/or a method of driving the semiconductor memory device.

According to some example embodiments, there is provided a semiconductor memory device for a hash solution, including a hashing logic block including a plurality of hashing logics configured to perform a hash function, a memory cell block including a plurality of memory cells, an input/output (I/O) control structure configured to change a data interface between the hashing logic block and the memory cell block based on a characteristic of the hash function to be performed.

According to some example embodiments, there is provided a method of driving a semiconductor memory device for a hash solution, the method including initializing a data interface between a hashing logic block and a memory cell block, receiving a request to change the data interface from a host, the request to change the data interface based on a characteristic of a hash function to be performed, and changing the data interface based on the request.

According to some example embodiments, there is provided a method of driving a semiconductor memory device for a hash solution, the method including storing a value of a data interface in a non-volatile memory as an I/O configuration, the data interface being between a hashing logic block and a memory cell block, initializing the data interface to the I/O configuration, receiving a request to change the data interface based on a characteristic of a hash function to be performed, and changing the data interface based on the request to change the data interface.

DETAILED DESCRIPTION

Hereinafter, a semiconductor memory device for a hash solution and a method of driving the same according to some example embodiments will be described with reference to the accompanying drawings.

To obtain a virtual currency, a hash function may be performed using a personal computer (PC) or a separate device. Obtaining the virtual currency by performing the hash function may be referred to as 'mining.' To obtain most virtual currencies, a hash function may be performed (e.g., the virtual currencies may be mined) by combining a graphic processing unit (GPU) with software. The hash function used for the virtual currencies may frequently access a specific data structure stored in a memory. A typical semiconductor memory device (hardware) may not be efficient enough to deal with various hash functions. Although various kinds of block chain techniques have been developed and used, a semiconductor memory device for various kinds of block chains has not been developed. Various hash functions may be performed to mine various currencies.

Accordingly, since the typical semiconductor memory device is configured to perform, at most, one hash function, efficiency may be reduced during the mining of various other virtual currencies.

Some inventive concepts propose a semiconductor memory device for a hash solution, which may dynamically adjust a memory interface according to a memory access method during the performing of a hash function using a processing-in memory (PIM), and/or a method of driving the semiconductor memory device. In the semiconductor memory device for the hash solution and the method of driving the same, according to the inventive concepts, operations may be performed in a state improved or optimized for various hash functions to improve hash efficiency (e.g., the mining efficiency of a cryptocurrency).

Figure 1:
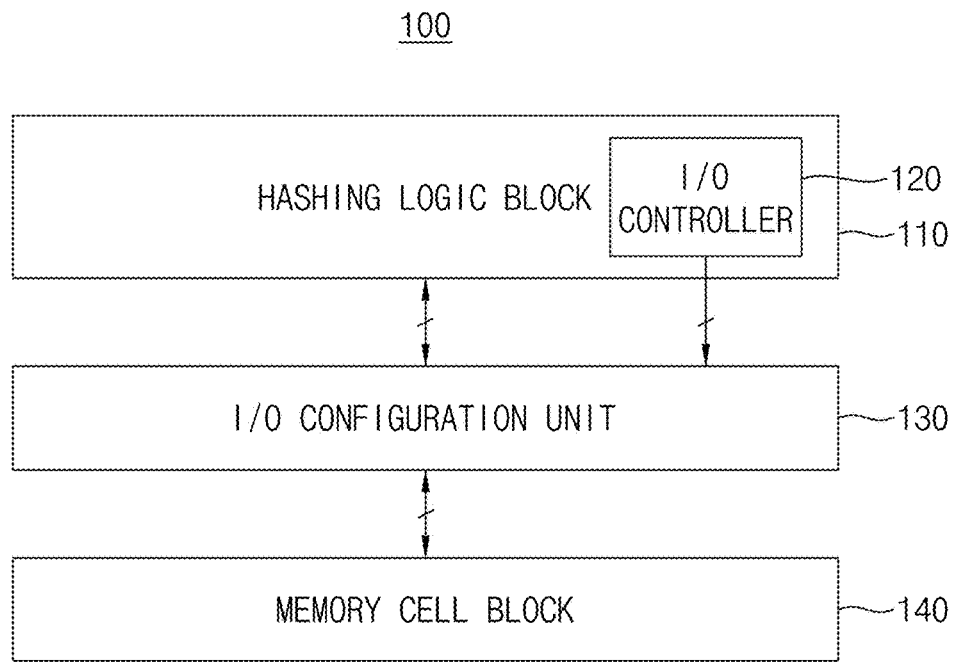
FIG. 1 is a diagram illustrating a semiconductor memory device for a hash solution according to some example embodiments.
Figure 2:
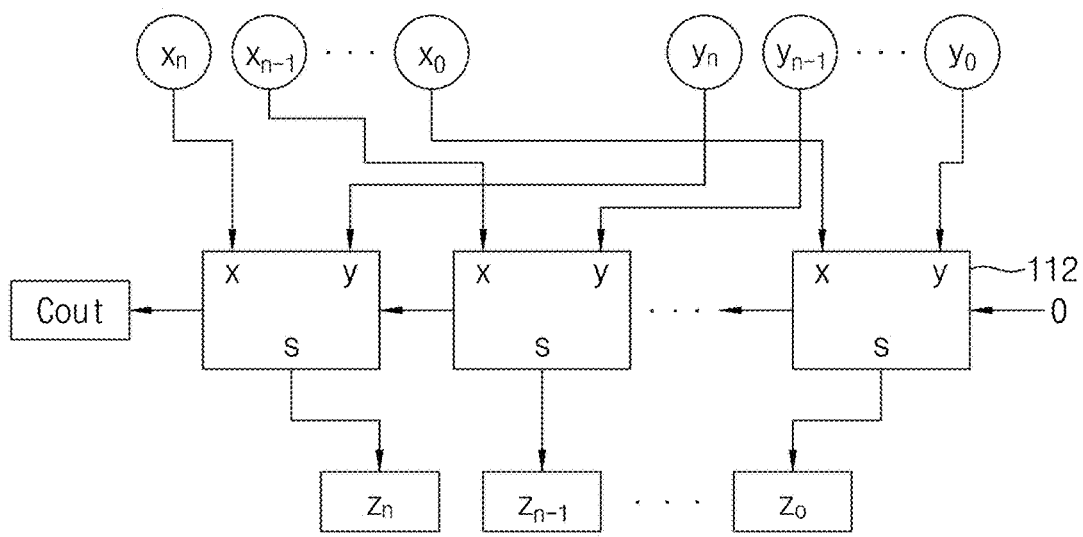
FIG. 2 is a diagram illustrating a hashing logic block shown in FIG. 1.
Figure 3:
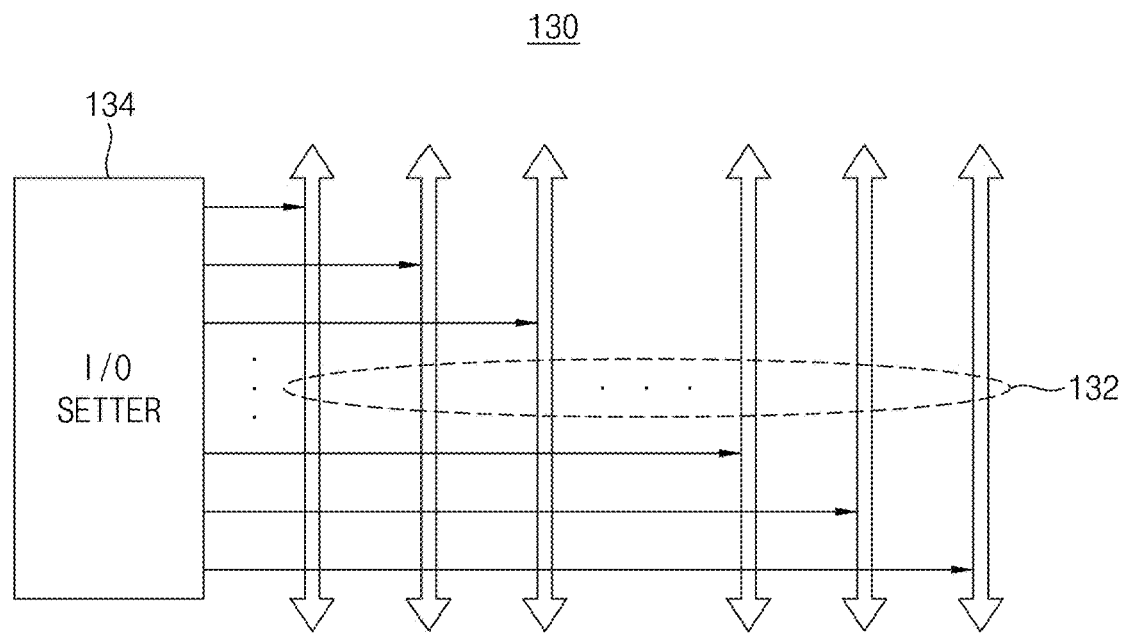
FIG. 3 is a diagram illustrating an input/output (I/O) configuration unit shown in FIG. 1.

FIG. 1 is a diagram illustrating a semiconductor memory device 100 for a hash solution according to some example embodiments. FIG. 2 is a diagram illustrating a hashing logic block 110 shown in FIG. 1. FIG. 3 is a diagram illustrating an input/output (I/O) configuration unit 130 shown in FIG. 1.

Referring to FIGS. 1 to 3, the semiconductor memory device 100 for the hash solution according to some example embodiments may include the hashing logic block 110, an I/O controller 120, the I/O configuration unit 130, and a memory cell block 140. FIG. 1 illustrates an example of a semiconductor device including an I/O structure. The I/O structure includes the I/O controller 120 and the I/O configuration unit 130. The I/O controller 120 and the I/O configuration unit 130 may be disposed ion different parts of the semiconductor device. For example, FIG. 1 shows the I/O controller 120 as part of the hashing logic block 110, separate from the I/O configuration unit 130. Alternatively, the I/O controller 120 may be part of the I/O configuration unit 130.

A host may request the semiconductor memory device 100 for the hash solution to change an I/O configuration on the basis of a cryptocurrency to be mined. That is, the host may transmit a change request message of a data interface to the semiconductor memory device 100 for the hash solution so as to configure a data interface improved or optimized for the cryptocurrency to be mined.

The hashing logic block 110 is a logic circuit including a plurality of hashing logics 112 configured to perform a hash function. The hash function may be received from the host by the I/O controller 120. The I/O controller may transmit the hash function logic to the hashing logic block 110. The hashing logic block 110 may perform the hash function on an input value, obtain a result value, and output the result value obtained by performing the hash function to the host.

Referring to FIG. 2, the hashing logics 112 may be configured to perform the hash function by applying a hash function signature S to respective input value pairs $x_n$ to $x_0$ and $y_n$ to $y_0$, where n is an integer greater than 0, and XORing the result with 0 in order to obtain intermediate result value $z_n$ to $z_0$. A final result value Cout may be output from the hashing logics 112 to the host.

Various block chain techniques may be used, and a data bandwidth between a core and a memory cell block may be different according to each block chain technique during the mining. To promote mining performance of various cryptocurrencies, a desired (or improved, or optimized) data bandwidth should be set for each block chain technique. To this end, the I/O controller 120 may receive an I/O configuration request of the semiconductor memory device 100 from the host. The I/O controller 120 may instruct the I/O configuration unit 130 to perform an I/O configuration on the basis of the I/O configuration request received from the host. The I/O controller 120 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In an example, after a PIM logic (hash function) of a cryptocurrency to be mined is determined, the I/O controller 120 may instruct the I/O configuration unit 130 to perform the I/O configuration according to the PIM logic (hash function). That is, the host may transmit the I/O configuration request for the cryptocurrency to be mined to the I/O controller 120. The I/O controller 120 may instruct the I/O configuration unit 130 to perform an I/O configuration for the cryptocurrency to be mined, on the basis of the I/O configuration request received from the host.

As an example, the I/O controller 120 may instruct the I/O configuration unit 130 to perform the I/O configuration to set I/O identifications (IDs) and I/O directions of a plurality of data buses 132 disposed in the I/O configuration unit 130.

The I/O configuration unit 130 may include the plurality of data buses 132 and an I/O setter 134. In some example embodiments, the I/O setter is a logic circuit. An I/O ID may be assigned to each of the plurality of data buses 132, and an I/O direction may be set for each of the plurality of data buses 132. The plurality of data buses 132 may be configured to transmit and receive data between the hashing logic block 110 and the memory cell block 140. The I/O IDs of the plurality of data buses 132 may be written as pin IDs or pin numbers.

The I/O setter 134 of the I/O configuration unit 130 may set I/O IDs and I/O directions of the plurality of data buses 132 on the basis of the instruction of the I/O configuration, which is received from the I/O controller 120.

Figure 4:
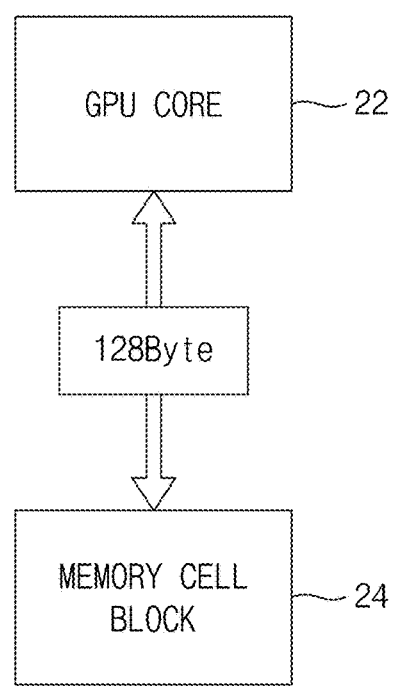
FIG. 4 is a diagram illustrating a process of performing a hash function using a GPU.

FIG. 4 is a diagram illustrating a process of performing a hash function using a GPU.

Referring to FIG. 4, a process of mining Ethereum™, which is one type of virtual currency, using a GPU will be described as an example.

When Ethereum™ is mined, a hashing algorithm named 'Ethash™' may be used. In the 'Ethash™' hashing algorithm, a GPU core 22 may load 128-byte data from a memory cell block 24 (e.g., a graphics double data rate (GDDR)). Thereafter, the GPU core 22 may perform an operation on the data loaded from the memory cell block 24 and output an operation result.

During the mining of Ethereum™, the GPU core 22 may not load sequential data from the memory cell block 24. During the mining of Ethereum™, the GPU core 22 may load random data from the memory cell block 24. In other words, since there is no connection between currently used data and next data to be used, the GPU core 22 may not need to access continuous data of 128 bytes or more from the memory cell block 24.

It may be efficient for a typical GPU core 22 to simultaneously load a lot of data from the memory cell block 24 and process operations on the data. A typical GPU may set a data interface between the GPU core 22 and the memory cell block 24 to a data bandwidth of 256 bytes or 512 bytes and transmit and receive data through the set data bandwidth.

As an example, when comparing a GTX1070™ GPU with a GTX1080™ GPU, it can be seen that the GTX1080™

GPU has better GPU performance than the GTX1070™ GPU. A data bandwidth of the GTX1070™ GPU may be set to 256 bytes, and a data bandwidth of the GTX1080™ GPU may be set to 512 bytes. The mining performance of cryptocurrencies may vary according to the data bandwidth of the GPU.

When the data bandwidth between the GPU core 22 and the memory cell block 24 is set to 256 bytes, an actual available data bandwidth of an Ethereum™ hashing algorithm may be half of 256 bytes. That is, since a data bandwidth of the Ethereum™ hashing algorithm is 128 bytes, even if the data bandwidth between the GPU core 22 and the memory cell block 24 is set to 256 bytes, an actual utilization rate of the data bandwidth may be 50%.

In addition, when the data interface between the GPU core 22 and the memory cell block 24 is set to 512 bytes, the data bandwidth that may be actually utilized by the Ethereum™ hashing algorithm may be ¼ of 512 bytes. That is, since the data bandwidth of the Ethereum™ hashing algorithm is 128 bytes, even if the data bandwidth between the GPU core 22 and the memory cell block 24 is set to 512 bytes, the actual utilization rate of the data bandwidth may be 25%.

As described above, since the data bandwidth (128 bytes) applied to the mining of Ethereum™ is different from the data bandwidth (256 bytes or 512 bytes) set between the GPU core 22 and the memory cell block 24, the operation efficiency of the GPU core 22 may be reduced, and the mining performance of cryptocurrencies may also be degraded.

TABLE 1

| Algorithm | scratchpad/DAG capacity | scratchpad/DAG size |
| --- | --- | --- |
| Cryptonight ™ | 2 MB | 128 bytes |
| Equihash ™ | 204 MB | 44 bytes |
| Ethash ™ | 1024 MB | 128 bytes |
| SHA256D ™ | 2 MB | 64 bytes |

As shown in Table 1, since each hashing algorithm has a different data bandwidth, a typical GPU having a fixed data bandwidth may not satisfy the mining performance of various cryptocurrencies. In particular, in the case of a Equihash™ or SHA256D™ hashing function, the mining performance of cryptocurrencies may be lower than that of Ethereum™.

Figure 5:
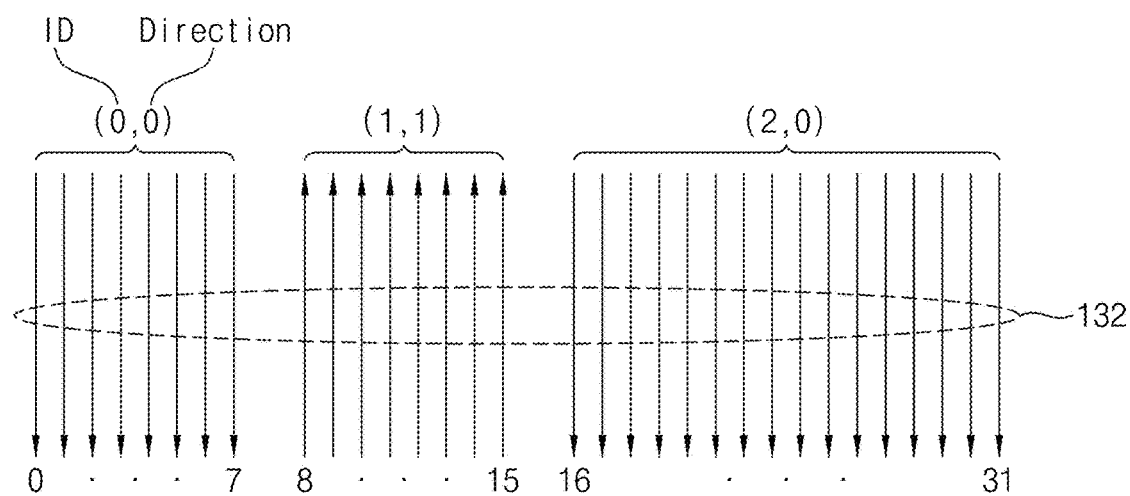
FIG. 5 is a diagram illustrating a process of configuring I/O IDs and I/O directions of data buses by an I/O configuration unit.

FIG. 5 is a diagram illustrating a process of configuring I/O IDs and I/O directions of data buses by an I/O configuration unit, according to some example embodiments.

Referring to FIG. 5, an I/O configuration unit 130 may dynamically adjust a memory interface between a hashing logic block 110 and a memory cell block 140 based on a hashing function of a block chain. That is, the I/O configuration unit 130 may dynamically adjust a data bandwidth between the hashing logic block 110 and the memory cell block 140 to be improved or optimized for the mining of a cryptocurrency to be mined.

As an example, an I/O setter 134 of the I/O configuration unit 130 may receive an instruction to perform an I/O configuration from an I/O controller 120. The I/O setter 134 may set I/O IDs and I/O directions of a plurality of data buses 132, on the basis of the received instruction of the I/O configuration.

The I/O setter 134 may set the I/O IDs and the I/O directions of the plurality of data buses 132 and dynamically adjust the memory interface (or data bandwidth) between the hashing logic block 110 and the memory cell block 140. The I/O setter 134 may set an I/O ID and an I/O direction for each data bus pin number.

As an example, the I/O setter 134 may set I/O IDs of eight data buses 132 (e.g., a 0-th data bus 132 to a seventh data bus 132), from among the plurality of data buses 132, to '0,' and set an I/O direction of the 0-th to seventh data buses 132 to write '0.'

As an example, the I/O setter 134 may set I/O IDs of eight data buses 132 (e.g., an eighth data bus 132 to a fifteenth data bus 132), from among the plurality of data buses 132, to '1,' and set an I/O direction of the eighth to fifteenth data buses 132 to read '1.'

As an example, the I/O setter 134 may set I/O IDs of sixteen data buses 132 (e.g., a sixteenth data bus 132 to a thirty-first data bus 132), from among the plurality of data buses 132, to '2,' and set an I/O direction of the sixteenth to thirty-first data buses 132 to write '0.'

As an example, in a hashing function (e.g., Ethereum™) in which a percentage of reads is higher than a percentage of writes, the I/O setter 134 may set the I/O direction of 60 to 90% of data buses 132 of all the data buses 132 to read '1.' Further, the I/O setter 134 may set the I/O direction of 10 to 40% of data buses 132 of all the data buses 132 to write '0.'

As an example, in a hashing function (e.g., Zcash's Equihash™) in which a percentage of reads is equal to a percentage of writes (1:1), the I/O setter 134 may set the I/O direction of 50% of the data buses 132 of all the data buses 132 to read '1.' Further, the I/O setter 134 may set the I/O direction of 50% of the data buses 132 of all the data buses 132 to write '0.'

Thus, the I/O direction of each of the plurality of data buses 132 may be dynamically adjusted according to a cryptocurrency to be mined.

As an example, when a PIM semiconductor memory device includes a plurality of logics that may operate simultaneously, the I/O controller 120 may assign a logic ID to each of the logics. Further, the data buses 132 may be distributed by logic IDs.

When four cores configured to perform a hash function are disposed in the PIM semiconductor memory device, logic IDs '0,' '1,' '2,' and '3' may be assigned to the respective cores.

The I/O setter 134 may divide all the data buses 132 by four and equally allocate the data buses 132 to the respective cores. The I/O setter 134 may dynamically adjust the I/O direction of each of the data buses 132 according to a hashing function.

When a large number of data buses 132 are allocated to a specific core of a plurality of cores and a small number of data buses 132 are allocated to another core, hashing performance may be degraded due to data bottlenecks. The semiconductor memory device 100 for the hash solution according to some example embodiments may equally allocate the data buses 132 to a plurality of cores. The semiconductor memory device 100 for the hash solution according to some example embodiments may reduce waiting times of operations of the cores due to data bottlenecks.

Figure 6:
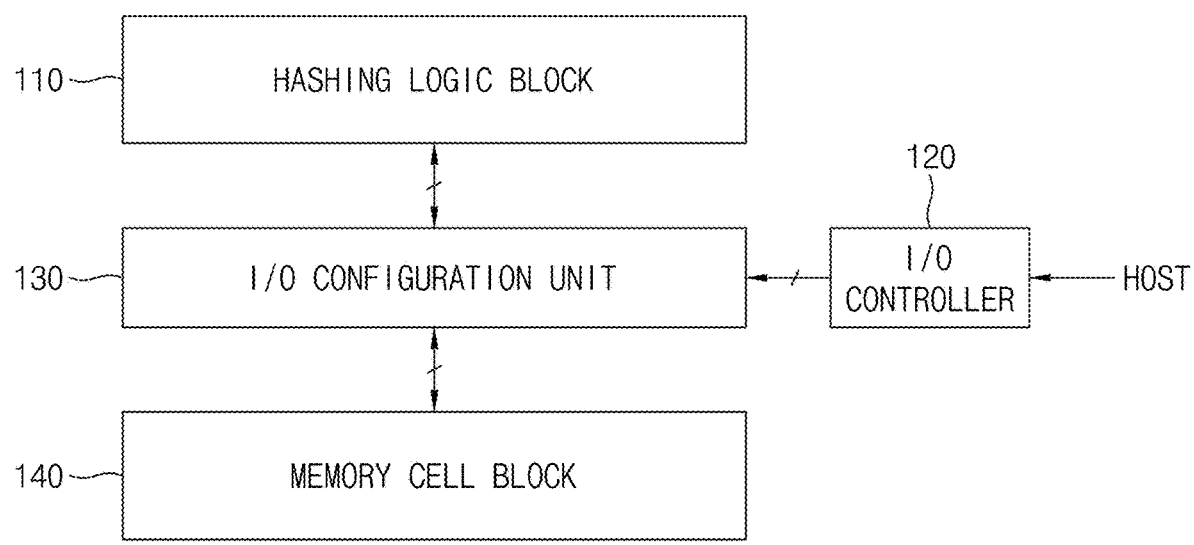
FIG. 6 is a diagram illustrating a semiconductor memory device for a hash solution according to some example embodiments.

FIG. 6 is a diagram illustrating a semiconductor memory device for a hash solution according to some example embodiments, in which an I/O controller is independently disposed.

Referring to FIGS. 1 and 6, FIG. 1 illustrates an example in which the I/O controller 120 is disposed in a region in which the hashing logic block 110 is formed. However, the inventive concepts are not limited thereto, and the I/O controller 120 may be independently disposed separately from the hashing logic block 110, the I/O configuration unit 130, and the memory cell block 140. Even if the I/O controller 120 is independently disposed, the semiconductor memory device of FIG. 6 may operate in the same manner as the semiconductor memory device 100 for the hash solution, which is shown in FIG. 1.

Figure 7:
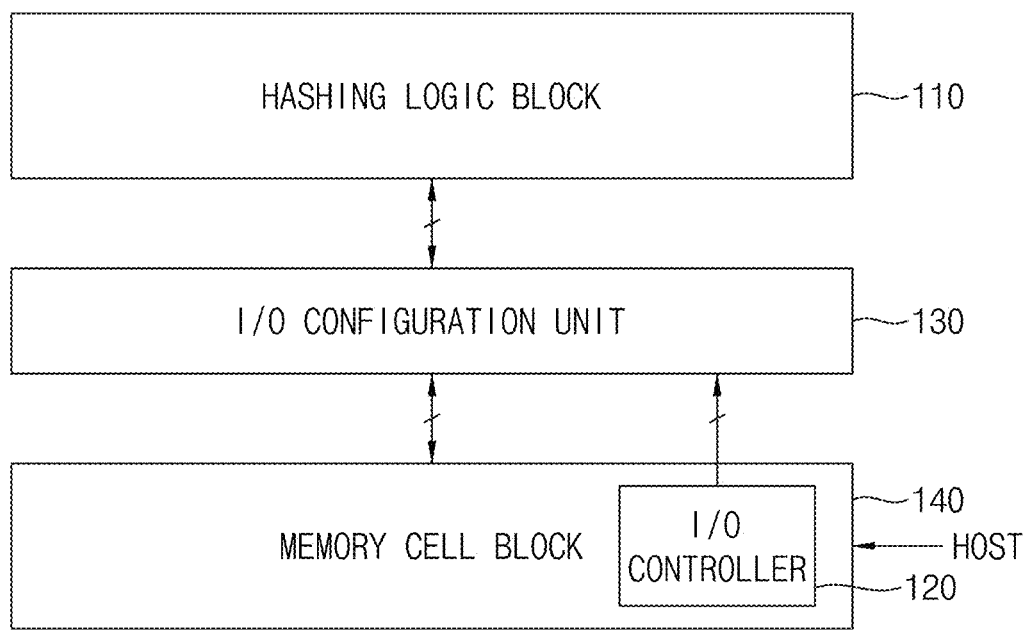
FIG. 7 is a diagram of a semiconductor memory device for a hash solution according to some example embodiments.

FIG. 7 is a diagram of a semiconductor memory device for a hash solution according to some example embodiments, in which an I/O controller 120 is disposed in a memory cell block.

Referring to FIGS. 1 and 7, FIG. 1 illustrates an example in which the I/O controller 120 is disposed in a region in which the hashing logic block 110 is formed. However, the inventive concepts are not limited thereto, and the I/O controller 120 may be disposed in a region in which the memory cell block 140 is formed. Even if the I/O controller 120 is disposed in the region in which the memory cell block 140 is formed, the semiconductor memory device of FIG. 7 may operate in the same manner as the semiconductor memory device 100 for the hash solution, which is shown in FIG. 1.

Figure 8A:
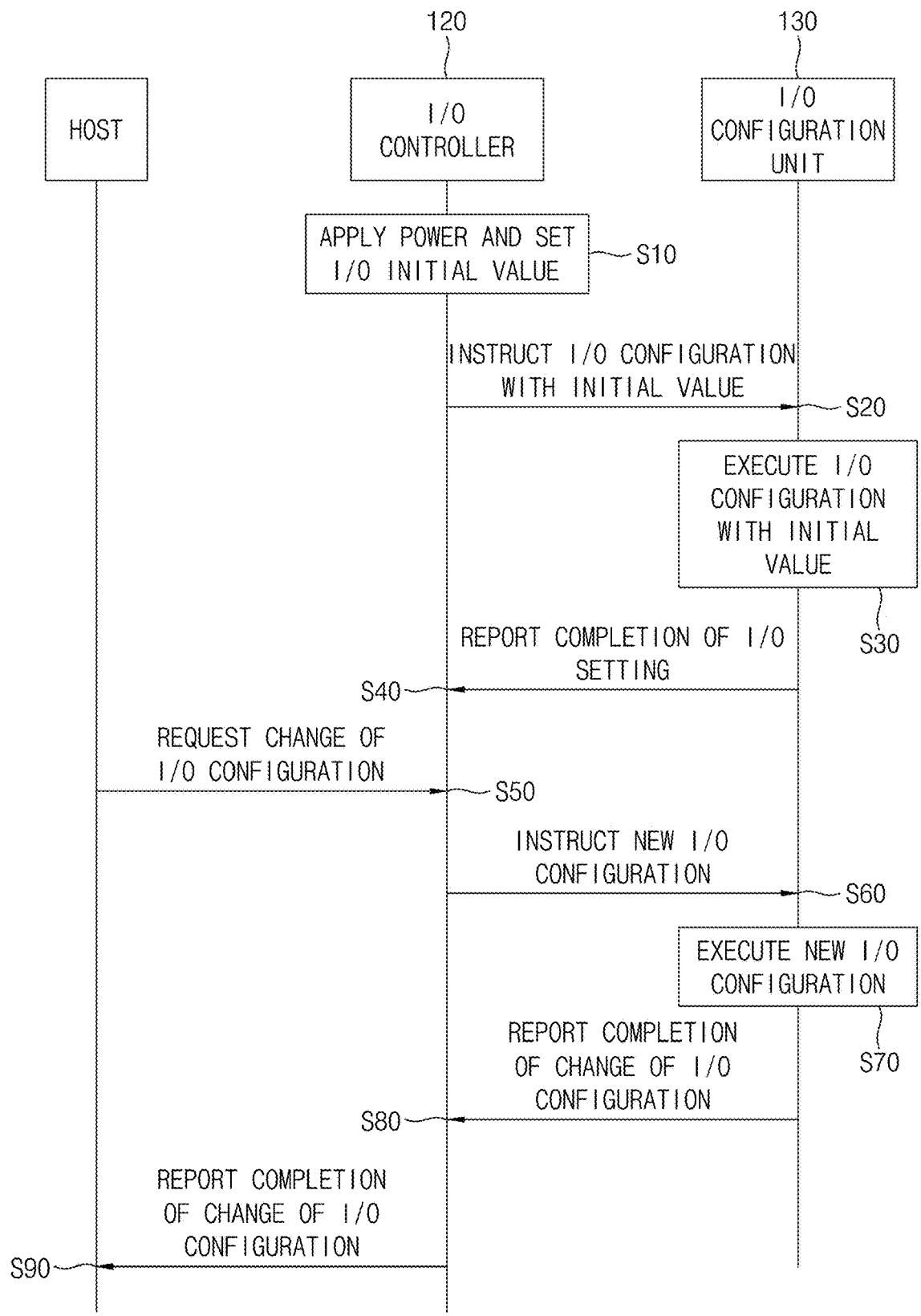
FIG. 8A is a diagram illustrating a method of driving a semiconductor memory device for a hash solution according to some example embodiments.

FIG. 8A is a diagram illustrating a method of driving a semiconductor memory device for a hash solution according to some example embodiments.

Referring to FIGS. 1, 3, 5, and 8A, when power is applied to the semiconductor memory device 100 for the hash solution, the I/O controller 120 may set an I/O initial value (S10).

A value for an arbitrary hash algorithm (e.g., I/O interface data improved or optimized for Ethereum™) may be previously set as the I/O initial value. A non-volatile memory may be additionally disposed in the semiconductor memory device 100 for the hash solution. The I/O initial value may be stored in the non-volatile memory additionally disposed in the semiconductor memory device 100 for the hash solution. When power is applied, the I/O controller 120 may load and set the I/O initial value from the non-volatile memory.

Thereafter, the I/O controller 120 may instruct the I/O configuration unit 130 to perform an I/O configuration such that the I/O initial value is set as a data bandwidth between the hashing logic block 110 and the memory cell block 140 (S20).

The I/O controller 120 may transmit an I/O initial value for a specific hash algorithm (e.g., I/O interface data improved or optimized for Ethereum™) to the I/O configuration unit 130.

Subsequently, the I/O configuration unit 130 may execute the I/O configuration on the basis of the instruction of the I/O configuration, which is received from the I/O controller 120 (S30).

The I/O configuration unit 130 may set I/O IDs and I/O directions of the plurality of data buses 132 as the I/O initial value for the specific hash algorithm (e.g., I/O interface data improved or optimized for Ethereum™).

Thereafter, the I/O configuration unit 130 may transmit a result of the execution of the I/O configuration to the I/O controller 120. That is, the I/O configuration unit 130 may report the completion of I/O setting to the I/O controller 120 (S40).

The I/O controller 120 may receive the result of the execution of the I/O configuration from the I/O configuration unit 130 and complete an initial I/O configuration. In this case, when the result of the execution of the I/O configuration is not received from the I/O configuration unit 130 in a given (or alternatively, predetermined) amount of time, the I/O controller 120 may return to operation S10 and re-execute the initial I/O configuration.

Next, the host may request the I/O controller 120 to change an interface between the hashing logic block 110 and the memory cell block 140 according to a cryptocurrency to be mined. That is, the host may request the I/O controller 120 to change the I/O configuration (S50).

Thereafter, the I/O controller 120 may receive a request to change the I/O configuration from the host. The I/O controller 120 may instruct the I/O configuration unit 130 to perform a new I/O configuration on the basis of the request to change the I/O configuration, which is received from the host (S60). That is, the I/O controller 120 may instruct the I/O configuration unit 130 to change the I/O configuration to be improved or optimized for the cryptocurrency to be mined.

As an example, the I/O controller 120 may instruct the I/O configuration unit 130 to perform the I/O configuration to set the I/O IDs and the I/O directions of the plurality of data buses 132 disposed in the I/O configuration unit 130.

Subsequently, the I/O configuration unit 130 may execute a new I/O configuration on the basis of the request to change the I/O configuration, which is received from the I/O controller 120. That is, the I/O configuration unit 130 may change I/O configurations of the plurality of data buses 132 on the basis of the request to change the I/O configuration, which is received from the I/O controller 120 (S70).

As an example, the I/O setter 134 of the I/O configuration unit 130 may set the I/O IDs and the I/O directions of the plurality of data buses 132 on the basis of the instruction of the I/O configuration, which is received from the I/O controller 120. In this case, the I/O setter 134 may sequentially set the I/O IDs and the I/O directions of the data buses 132 one by one.

The I/O setter 134 may set the I/O ID and the I/O direction of each of the plurality of data buses 132 and dynamically adjust a memory interface (or the data bandwidth) between the hashing logic block 110 and the memory cell block 140.

As shown in FIG. 5, the I/O setter 134 may set I/O IDs of eight data buses 132 (a 0-th data bus 132 to a seventh data bus 132), from among the plurality of data buses 132, to '0,' and set an I/O direction of the 0-th to seventh data buses 132 to write '0.' The I/O setter 134 may set I/O IDs of eight data buses 132 (an eighth data bus 132 to a fifteenth data bus 132), from among the plurality of data buses 132, to '1,' and set an I/O direction of the eighth to fifteenth data buses 132 to read '1.' The I/O setter 134 may set I/O IDs of sixteen data buses 132 (e.g., a sixteenth data bus 132 to a thirty-first data bus 132), from among the plurality of data buses 132, to '2,' and set an I/O direction of the sixteenth to thirty-first data buses 132 to write '0.'

As an example, the I/O setter 134 may set the I/O direction of the plurality of data buses 132 on the basis of percentages taken by reads and writes in each hash function.

When a percentage of reads is higher than a percentage of writes in a hash function to be currently performed, the I/O setter 134 may set the I/O direction of 60 to 90% of data buses 132 of all the data buses 132 to read '1,' and set the I/O direction of the remaining 10 to 40% of data buses 132 to write '0.'

Conversely, when the percentage of writes is higher than the percentage of reads in the hash function to be currently performed, the I/O setter 134 may set the I/O direction of 60 to 90% of data buses 132 of all the data buses 132 to write '0,' and set the I/O direction of the remaining 10 to 40% of data buses 132 to read '1.'

As an example, when the percentage of reads is equal to the percentage of writes (1:1) in the hash function to be currently performed, the I/O setter 134 may set the I/O direction of 50% of the data buses 132 of all the data buses 132 to read '1,' and set the I/O direction of the remaining 50% of the data buses 132 to write '0.' Thus, the I/O direction of each of the plurality of data buses 132 may be dynamically adjusted according to the cryptocurrency to be mined.

Thereafter, the I/O configuration unit 130 may transmit a result of the change of the I/O configuration to the I/O controller 120. That is, the I/O configuration unit 130 may report the completion of the change of the I/O configuration to the I/O controller 120 (S80).

When a report on the completion of the change of the I/O configuration is not received from the I/O configuration unit 130 in a given (or alternatively, predetermined) amount of time, the I/O controller 120 may return to operation S60 and re-execute the change of the I/O configuration.

Subsequently, the I/O controller 120 may report the completion of the change of the I/O configuration to the host on the basis of the report on the completion of the change of the I/O configuration, which is received from the I/O configuration unit 130 (S90).

Although not shown in FIG. 8A, when the hashing logic block 110 includes a plurality of logics that may operate simultaneously, the I/O controller 120 may assign a logic ID to each of the logics. The I/O controller 120 may transmit the logic ID along with the instruction of the I/O configuration to the I/O configuration unit 130.

The I/O configuration unit 130 may distribute the data buses 132 by logic IDs. When four cores are disposed in the hashing logic block 110, the I/O controller 120 may assign logic IDs '0,' '1,' '2,' and '3' to the respective cores. The I/O setter 134 may divide all the data buses 132 by four and equally allocate the data buses 132 to the respective cores. The I/O setter 134 may dynamically adjust the I/O direction of each of the data buses 132 according to a hashing function. The semiconductor memory device 100 for the hash solution according to some example embodiments may equally allocate the data buses 132 to a plurality of cores and reduce waiting times of operations of the cores due to data bottlenecks.

Figure 8B:
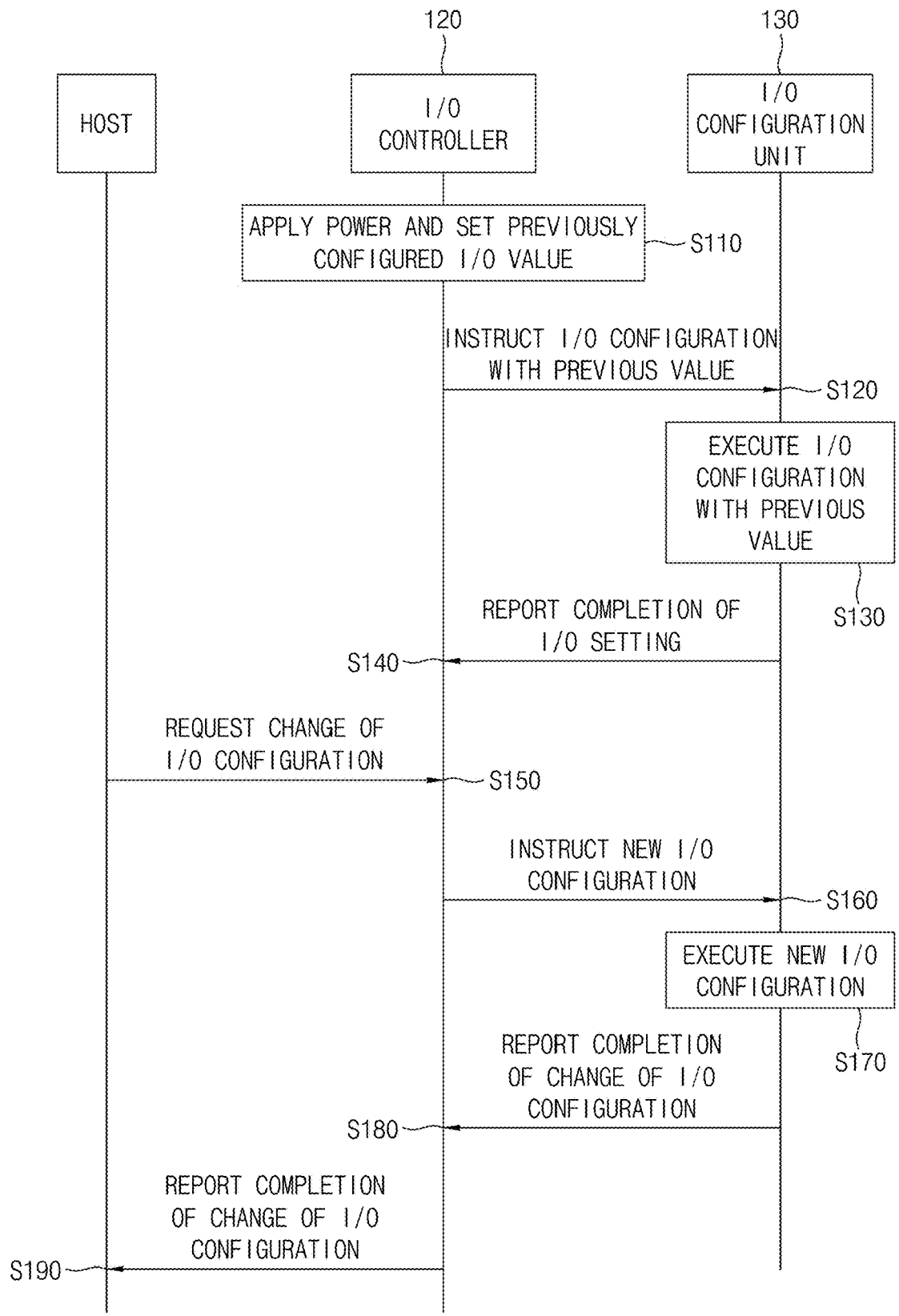
FIG. 8B is a diagram illustrating a method of driving a semiconductor memory device for a hash solution according to some example embodiments.

FIG. 8B is a diagram illustrating a method of driving a semiconductor memory device 100 for a hash solution according to some example embodiments.

Referring to FIGS. 1, 3, 5, and 8B, when power is applied to the semiconductor memory device 100 for the hash solution, the I/O controller 120 may set an I/O configuration value, which has been configured during a previous operation (S110).

As an example, when the semiconductor memory device 100 for the hash solution operates, the I/O controller 120 may store an I/O configuration value, which is obtained in a current point in time, in a non-volatile memory. An operation of mining a cryptocurrency may be repeatedly performed over a long period of time. That is, a hash function of the same block chain may be repeatedly performed. When the semiconductor memory device 100 for the hash solution is powered off and then powered on again, the I/O controller 120 may load and set the I/O configuration value, which has been previously configured in the non-volatile memory.

Thereafter, the I/O controller 120 may instruct the I/O configuration unit 130 to perform an I/O configuration such that a previous I/O configuration value is set as a data bandwidth between the hashing logic block 110 and the memory cell block 140 (S120).

The I/O controller 120 may transmit an I/O configuration value for a specific hash algorithm (e.g., I/O interface data improved or optimized for Ethereum™) to the I/O configuration unit 130.

Thereafter, the I/O configuration unit 130 may execute the I/O configuration on the basis of the instruction of the I/O configuration, which is received from the I/O controller 120 (S130).

The I/O configuration unit 130 may set I/O IDs and I/O directions of a plurality of data buses 132 using the I/O configuration value for the specific hash algorithm (e.g., the I/O interface data improved or optimized for Ethereum™)

Thereafter, the I/O configuration unit 130 may transmit a result of the execution of the I/O configuration to the I/O controller 120. That is, the I/O configuration unit 130 may report the completion of I/O setting to the I/O controller 120 (S140).

The I/O controller 120 may receive the result of the execution of the I/O configuration from the I/O configuration unit 130 and complete an initial I/O configuration. In this case, when the result of the execution of the I/O configuration is not received from the I/O configuration unit 130 in a given (or alternatively, predetermined) amount of time, the I/O controller 120 may return to operation S110 and re-execute the I/O configuration.

Next, a host may request the I/O controller 120 to change an interface between the hashing logic block 110 and the memory cell block 140 according to a cryptocurrency to be mined. That is, when the cryptocurrency to be mined is changed, the host may request the I/O controller 120 to change the I/O configuration so as to be improved or optimized for a new hash function to be performed (S150).

Subsequently, the I/O controller 120 may receive the request to change the I/O configuration from the host. The I/O controller 120 may instruct the I/O configuration unit 130 to perform a new I/O configuration on the basis of the request to change the I/O configuration, which is received from the host (S160). That is, the I/O controller 120 may instruct the I/O configuration unit 130 to change the I/O configuration so as to be improved or optimized for a cryptocurrency to be mined.

As an example, the I/O controller 120 may instruct the I/O configuration unit 130 to perform the I/O configuration so as to set I/O IDs and I/O directions of the plurality of data buses 132 disposed in the I/O configuration unit 130.

Next, the I/O configuration unit 130 may execute a new I/O configuration on the basis of the request to change the I/O configuration, which is received from the I/O controller 120. That is, the I/O configuration unit 130 may change I/O configurations of the plurality of data buses 132 on the basis of the request to change the I/O configuration, which is received from the I/O controller 120 (S170).

As an example, the I/O setter 134 of the I/O configuration unit 130 may set I/O IDs and I/O directions of the plurality of data buses 132 on the basis of the instruction of the I/O configuration, which is received from the I/O controller 120. In this case, the I/O setter 134 may sequentially set the I/O IDs and the I/O directions of the data buses 132 one by one.

The I/O setter 134 may set the I/O ID and the I/O direction of each of the plurality of data buses 132 and dynamically adjust a memory interface (or the data bandwidth) between the hashing logic block 110 and the memory cell block 140.

As shown in FIG. 5, the I/O setter 134 may set the I/O ID of plurality of data buses 132 to '0' or '1.' The I/O setter 134 may set the I/O direction of the plurality of data buses 132 to write '0' or read '1.'

As an example, the I/O setter 134 may set the I/O direction of the plurality of data buses 132 on the basis of percentages taken by reads and writes in each hash function.

When a percentage of reads is higher than a percentage of writes in a hash function to be currently performed, the I/O setter 134 may set the I/O direction of 60 to 90% of data buses 132 of all the data buses 132 to read '1,' and set the I/O direction of the remaining 10 to 40% of data buses 132 to write '0.'

Conversely, when the percentage of writes is higher than the percentage of reads in the hash function to be currently performed, the I/O setter 134 may set the I/O direction of 60 to 90% of data buses 132 of all the data buses 132 to write '0,' and set the I/O direction of the remaining 10 to 40% of data buses 132 to read '1.'

As an example, when the percentage of reads is equal to the percentage of writes (1:1) in the hash function to be currently performed, the I/O setter 134 may set the I/O direction of 50% of the data buses 132 of all the data buses 132 to read '1,' and set the I/O direction of the remaining 50% of the data buses 132 to write '0.' Thus, the I/O direction of each of the plurality of data buses 132 may be dynamically adjusted according to the cryptocurrency to be mined.

Thereafter, the I/O configuration unit 130 may transmit a result of the change of the I/O configuration to the I/O controller 120. That is, the I/O configuration unit 130 may report the completion of the change of the I/O configuration to the I/O controller 120 (S180).

When a report on the completion of the change of the I/O configuration is not received from the I/O configuration unit 130 in a given (or alternatively, predetermined) amount of time, the I/O controller 120 may return to operation S160 and re-execute the change of the I/O configuration.

Subsequently, the I/O controller 120 may report the completion of the change of the I/O configuration to the host on the basis of the report on the completion of the change of the I/O configuration, which is received from the I/O configuration unit 130 (S190).

Although not shown in FIG. 8B, when the hashing logic block 110 includes a plurality of logics that may operate simultaneously, the I/O controller 120 may assign a logic ID to each of the logics. The I/O controller 120 may transmit the logic ID along with the instruction of the I/O configuration to the I/O configuration unit 130.

The I/O configuration unit 130 may distribute the data buses 132 by logic IDs. When four cores are disposed in the hashing logic block 110, the I/O controller 120 may assign logic IDs '0,' '1,' '2,' and '3' to the respective cores. The I/O setter 134 may divide all the data buses 132 by four and equally allocate the data buses 132 to the respective cores. The I/O setter 134 may dynamically adjust the I/O direction of each of the data buses 132 according to a hashing function. The semiconductor memory device 100 for the hash solution according to some example embodiments may equally allocate the data buses 132 to a plurality of cores and reduce waiting times of operations of the cores due to data bottlenecks.

Figure 9:
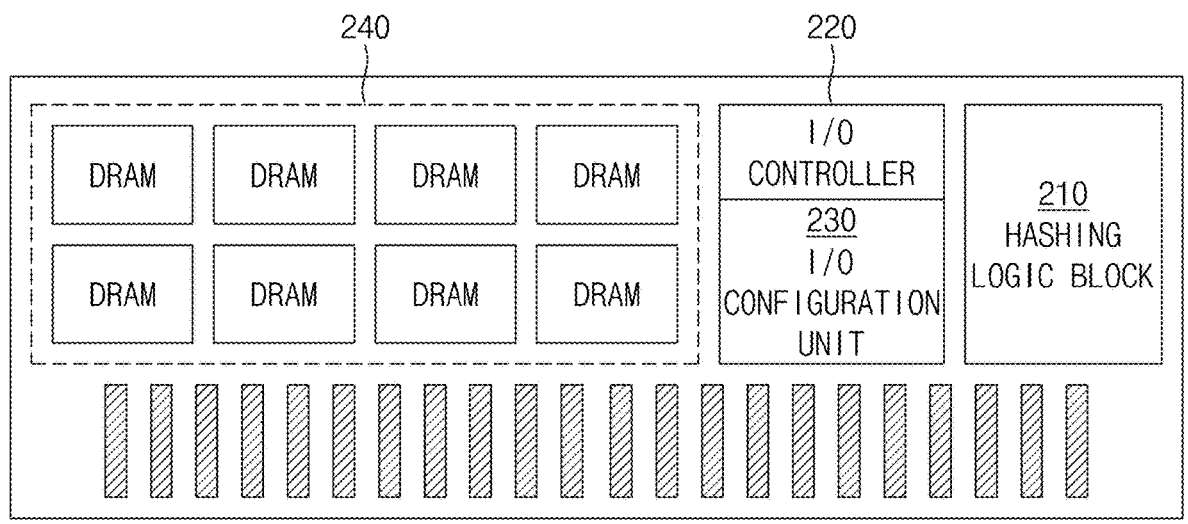
FIG. 9 is a diagram illustrating an example in which a semiconductor memory device for a hash solution according to some example embodiments is applied to a dual-in-line memory module (DIMM).

FIG. 9 is a diagram illustrating an example in which a semiconductor memory device 200 for a hash solution according to some example embodiments is applied to a dual-in-line memory module (DIMM).

Referring to FIG. 9, the semiconductor memory device 200 for the hash solution may be applied to a DIMM. The semiconductor memory device 200 for the hash solution may include a hashing logic block 210, an I/O controller 220, an I/O configuration unit 230, and/or a memory cell block 240. The hashing logic block 210, the I/O controller 220, the I/O configuration unit 230, and the memory cell block 240 may operate in the same manner as described with reference to FIGS. 1 to 8.

The memory cell block 240 may include a plurality of dynamic random access memory (DRAM) chips. The I/O configuration unit 230 may connect the plurality of DRAM chips to the hashing logic block 210. The I/O configuration unit 230 may dynamically change data interfaces between the plurality of DRAM chips and the hashing logic block 210 according to a hash function to be performed. When the semiconductor memory device 200 for the hash solution is applied to the DIMM, the mining efficiency of a cryptocurrency may be increased and power consumption may be reduced as compared with a method in which a GPU is combined with a GDDR.

Figure 10:
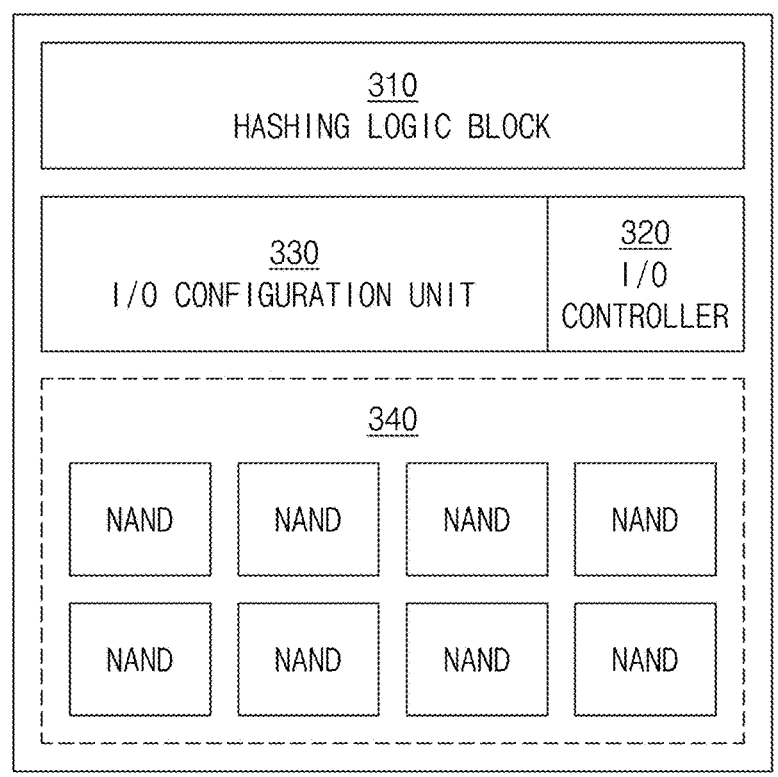
FIG. 10 is a diagram illustrating an example in which a semiconductor memory device for a hash solution according to some example embodiments is applied to a solid-state drive (SSD).

FIG. 10 is a diagram illustrating an example in which a semiconductor memory device 300 for a hash solution according to some example embodiments is applied to a solid-state drive (SSD).

Referring to FIG. 10, the semiconductor memory device 300 for the hash solution may be applied to an SSD. The semiconductor memory device 300 for the hash solution may include a hashing logic block 310, an I/O controller 320, an I/O configuration unit 330, and a memory cell block 340. The hashing logic block 310, the I/O controller 320, the I/O configuration unit 330, and the memory cell block 340 may operate in the same manner as described with reference to FIGS. 1 to 8.

The memory cell block 340 may include a plurality of NAND chips. The I/O configuration unit 330 may connect the plurality of NAND chips to the hashing logic block 310. The I/O configuration unit 330 may dynamically change data interfaces between the plurality of NAND chips and the hashing logic block 310 according to a hash function to be performed. When the semiconductor memory device 300 for the hash solution is applied to the SSD, the mining efficiency of cryptocurrencies may be increased and power consumption may be reduced as compared with a method in which a GPU is combined with a GDDR. When the semiconductor memory device 300 for the hash solution is applied to the SSD, a controller of the SSD may be substituted for the I/O configuration unit 330.

The inventive concepts are not limited thereto, and the semiconductor memory device 100 for the hash solution may be applied to a main board of a PC. When the semiconductor memory device 100 for the hash solution is combined with the main board, the cryptocurrencies may be mined without using the GPU. That is, when the semiconductor memory device 100 for the hash solution is combined with the main board, since the GPU has only to perform original functions thereof, there may be no need to apply expensive GPUs for the mining of the cryptocurrencies.

The inventive concepts are not limited thereto, and the semiconductor memory device 100 for the hash solution may be applied to a high-bandwidth memory (HBM).

A semiconductor memory device for a hash solution and a method of driving the same, according to some example embodiments, may dynamically adjust a memory interface according to a memory access method of a hash function during the performing of the hash function using a PIM, thereby improving hash efficiency (e.g., the mining efficiency of cryptocurrencies).

A semiconductor memory device for a hash solution and a method of driving the same, according to some example embodiments, may enable operations in a state improved or optimized for various hash functions and improve hash efficiency (e.g., the mining efficiency of cryptocurrencies).

According to some example embodiments of the inventive concepts, a semiconductor memory device for a hash solution and a method of driving the same can dynamically adjust a memory interface according to a memory access method of a hash function during the performing of the hash function using a PIM, thereby improving hash efficiency (e.g., the mining efficiency of cryptocurrencies).

A semiconductor memory device for a hash solution and a method of driving the same, according to some example embodiments of the inventive concepts, can enable operations of the semiconductor memory device in a state improved or optimized for various hash functions to improve hash efficiency (e.g., the mining efficiency of cryptocurrencies).

While some example embodiments of the inventive concepts have been described with reference to the accompanying drawings, it should be understood by those skilled in the art that various modifications may be made without departing from the scope of the inventive concepts and without changing essential features thereof. Therefore, the above-described example embodiments should be considered in a descriptive sense only and not for purposes of limitation.

What is claimed is:

1. A semiconductor memory device for a hash solution, the semiconductor memory device comprising:
    a hashing logic block including a plurality of hashing logics configured to perform a hash function;
    a memory cell block including a plurality of memory cells; and
    an input/output (I/O) control structure configured to change a data interface between the hashing logic block and the memory cell block based on a characteristic of the hash function to be performed prior to performing the hash function,
    wherein the I/O control structure includes a plurality of data buses configured to transmit and receive data between the hashing logic block and the memory cell block, and
    wherein the I/O control structure is configured to change the data interface by setting I/O identifications (IDs) and I/O directions of the plurality of data buses.

2. The semiconductor memory device of claim 1, wherein the I/O control structure includes,
    an I/O configuration unit configured to change the data interface between the hashing logic block and the memory cell block based on an instruction to change the data interface, the instruction being based on the characteristic of the hash function to be performed, and
    an I/O controller configured to
        receive a request to change the data interface from a host, and
        send the instruction to change the data interface to the I/O configuration unit.

3. The semiconductor memory device of claim 2, wherein the I/O configuration unit further comprises:
    an I/O setter logic circuit configured to set the I/O IDs and the I/O directions of the plurality of data buses.

4. The semiconductor memory device of claim 3, wherein the I/O setter logic circuit is further configured to,
    set the I/O ID of each of the plurality of data buses based on the instruction to change the data interface, and
    set the I/O direction of each of the plurality of data buses to write or read based on the instruction to change the data interface.

5. The semiconductor memory device of claim 3, wherein the I/O configuration unit is further configured to transmit a result of the changing of the data interface to the I/O controller.

6. The semiconductor memory device of claim 3, wherein the I/O controller is further configured to,
    load an initial value of the data interface from a non-volatile memory, and
    transmit the initial value of the data interface to the I/O configuration unit.

7. The semiconductor memory device of claim 6, wherein the I/O setter logic circuit is further configured to
    set the I/O ID of each of the plurality of data buses based on the initial value of the data interface, and
    set the I/O direction of each of the plurality of data buses to write or read based on the initial value of the data interface.

8. The semiconductor memory device of claim 7, wherein the I/O configuration unit is further configured to report a result of initializing the data interface to the I/O controller.

9. The semiconductor memory device of claim 3, wherein the I/O controller is further configured to,
    store a value of the data interface in a non-volatile memory as an I/O configuration value,
    load the I/O configuration value from the non-volatile memory in response to power being applied to the semiconductor memory device, and
    transmit the I/O configuration value to the I/O configuration unit.

10. The semiconductor memory device of claim 9, wherein the I/O setter logic circuit is further configured to,
    set the I/O ID of each of the plurality of data buses based on the I/O configuration value, and
    set the I/O direction of each of the plurality of data buses to write or read based on the I/O configuration value.

11. A method of driving a semiconductor memory device for a hash solution, the method comprising:
    initializing a data interface between a hashing logic block and a memory cell block;
    receiving a request to change the data interface from a host, the request to change the data interface being based on a characteristic of a hash function to be performed, and being received prior to performing the hash function; and
    changing the data interface based on the request, the changing the data interface including
        setting an I/O identification (ID) for each of a plurality of data buses, the plurality of data buses configured to transmit and receive data between the hashing logic block and the memory cell block, and
        setting an I/O direction of ach of the plurality of data buses to write or read.

12. The method of claim 11, further comprising:
    reporting a result of the changing of the data interface from an I/O configuration unit to an I/O controller.

13. The method of claim 11, wherein the initializing the data interface comprises:
    setting the I/O ID for each of the plurality of data buses; and setting the I/O direction of each of the plurality of data buses to write or read.

14. The method of claim 13, further comprising:
reporting a result of the initializing of the data interface from an I/O configuration unit to an I/O controller.

15. A method of driving a semiconductor memory device, the method comprising:
storing a value of a data interface in a non-volatile memory as an I/O configuration, the data interface being between a hashing logic block and a memory cell block;
initializing the data interface to the I/O configuration;
receiving a request to change the data interface from a host, the request being based on a characteristic of a hash function to be performed, and being received prior to performing the hash function; and
changing the data interface based on the request to change the data interface, the changing the data interface including setting an I/O identification (ID) for each of a plurality of data buses configured to transmit and receive data between the hashing logic block and the memory cell block and
setting an I/O direction of each of the plurality of data buses to write or read.

16. The method of claim 15, further comprising:
reporting a result of the changing of the data interface from an I/O configuration unit to an I/O controller.

17. The method of claim 15, wherein the initializing the data interface comprises:
setting the I/O ID for each of the plurality of data buses; and
setting the I/O direction of each of the plurality of data buses to write or read.

18. The method of claim 17, further comprising:
reporting a result of the initializing the data interface from an I/O configuration unit to an I/O controller.

* * * * *